United States Patent [19]
Hines et al.

[11] 3,753,126
[45] Aug. 14, 1973

[54] SIGNAL FREQUENCY DIVIDER WITH DUAL PHASE-DISPLACED SIGNAL OUTPUT

[75] Inventors: Robin H. Hines; William L. Hollinshead; Thomas O. Bolden, all of Tullahoma, Tenn.

[73] Assignee: Laser Systems & Electronics, Inc., Tullahoma, Tenn.

[22] Filed: Nov. 19, 1971

[21] Appl. No.: 200,532

Related U.S. Application Data

[62] Division of Ser. No. 18,101, March 10, 1970.

[52] U.S. Cl.............. 328/41, 307/225, 307/262, 328/55, 328/62, 328/155
[51] Int. Cl. ............................................ H03k 29/00
[58] Field of Search............. 307/225, 262, 269; 328/41, 5 S, 62, 155

[56] References Cited
UNITED STATES PATENTS
3,571,728  3/1971  Andrea et al. ................. 328/41
3,473,129  10/1969  Tschannen ..................... 328/55

*Primary Examiner*—John Zazworsky
*Attorney*—Lionel N. White

[57] ABSTRACT

Signal frequency divider apparatus is provided which yields a pair of electrical signals having a fixed phase relationship with one another and having a constant frequency ratio with a radio frequency input signal. The resulting phase-displaced signals are useful in deriving a modulating signal of high stability through combination with the orignal radio frequency signal in double-balanced mixers.

1 Claim, 2 Drawing Figures

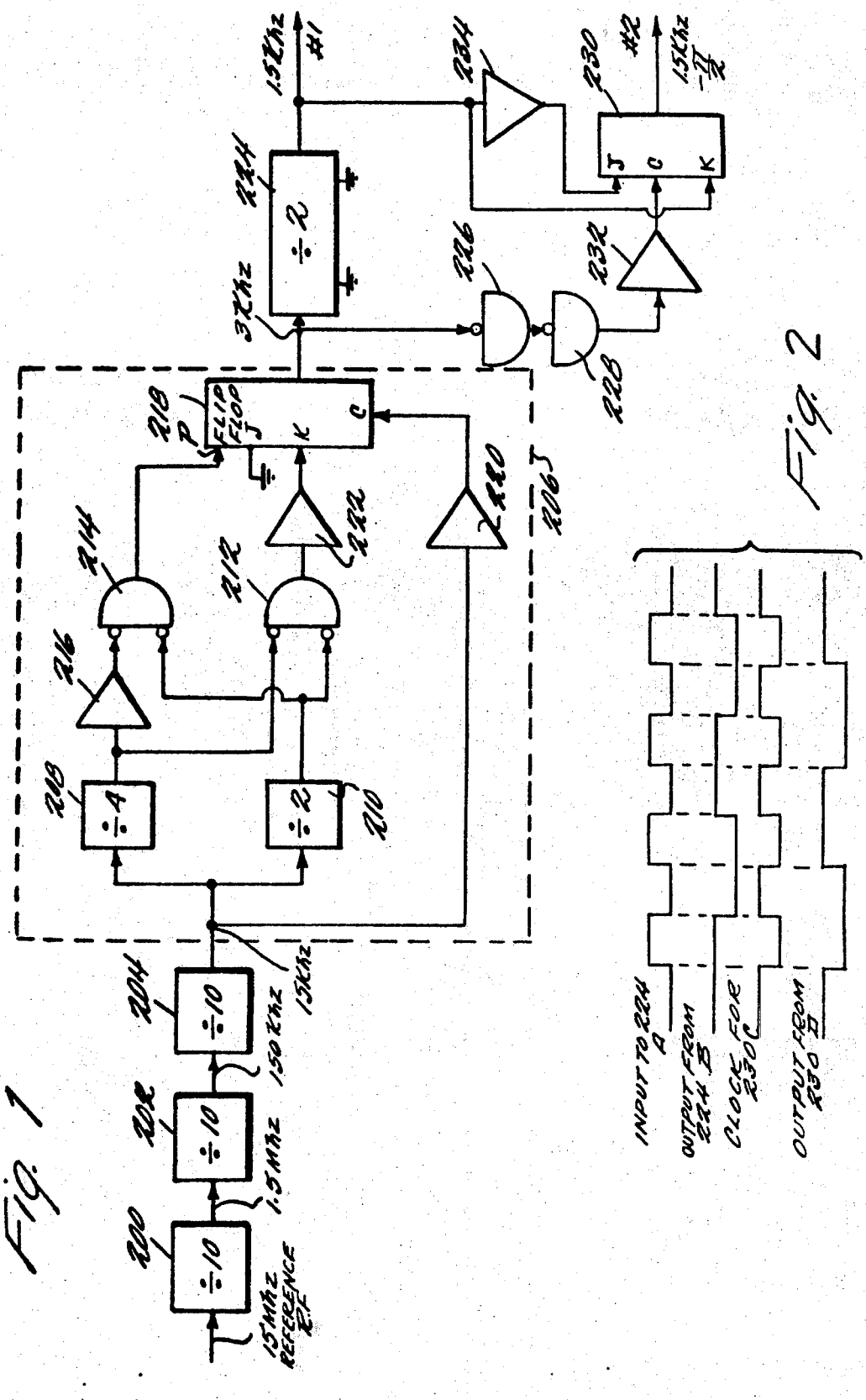

SIGNAL FREQUENCY DIVIDER WITH DUAL PHASE-DISPLACED SIGNAL OUTPUT

RELATED APPLICATION

This application is a division of U.S. Pat. application Ser. No. 18,101, filed Mar. 10, 1970, now abandoned in favor of continuing U.S. Pat. application Ser. No. 239,456, filed Mar. 30, 1972.

BACKGROUND

The related application describes a method and apparatus for measuring distances by detecting a phase shift between transmitted and returned modulated light beams. This general application of light beams for distance measuring has already been recognized in the art and in using such a technique one may attempt to measure the entire range all at one time by using a wavelength which is sufficiently long with respect to the distance being measured. This one-shot approach, however, results in considerable error since minute uncertainties in the measured phase difference correspond to rather significant distances. On the other hand, considerable precision may be gained in the least significant digits of a total range measurement by utilizing a wavelength much shorter than the total distance to be measured. For instance, if one uses a half wavelength of 10 meters and measures the resulting phase differences within one part in $10^4$, then the resulting measurement is accurate to within 1 millimeter in the four least significant digits of the total range. While this technique allows accurate determination of the least significant digits of a range measurement, there is, of course, a rather large uncertainty still remaining due to an unknown number of integral wavelengths contained in the round trip distance between the measuring apparatus and the remote target. successive A technique for resolving such ambiguity includes taking successive measurements at a plurality of frequencies and thus at different wavelengths. The successive range measurements made with these different wavelengths will result in different phase measurements which may be mathematically combined to eliminate the ambiguity in the original measurement by accurately determining one more significant digit with each sucssive ranging measurement. By adding these accurate and successively increasing significant digits to those accurate least significant digits already obtained from previous measurements, and extremely accurate overall or total distance measurement may be made.

A problem involved in this general method of making range measurements involves the accuracy with which the phase measurements are made, since the distance is directly proportional thereto. If the actual light beam is modulated, for example, at a radio frequency (RF) of approximately 15 MHz to obtain a phase shift corresponding to the measured distance, extra accuracy may be obtained if the return signal is down-converted to an intermediate frequency (IF) of approximately 1.5 kHz for the actual phase measurement. The down-conversion process has the advantage of smoothing the received signal in a manner analogous to an autocorrelator while also permitting the actual signal processing to be accomplished at a lower frequency where electronic manipulations may be more easily accomplished. Of course, the original phase information is retained in the down-conversion to the intermediate frequency as may be shown by resorting to the standard trigonometric identities.

For an instrument accuracy of 1 ppm or one millimeter for the least significant count, it is necessary for the IF to be stable to at least one part in $10^4$ (1 mm out of 10 meters) and for the RF to be stable to one part in $10^6$. It is thus apparent that if the IF were to be derived by down-conversion from RF signals which originated in two separate oscillators, one for transmission and one for a reference, each would have to be accurate to $1:10^{10}$. However, by deriving both the transmission frequency and the reference frequency from the same source, the $1:10^6$ is sufficient.

As described in the above-identified related application, the actual transmission frequencies obtained by utilizing an RF signal of about 15 MHz from a primary oscillator having the noted $1:10^6$ stability and accurately dividing that RF signal by a factor of $10^4$ to obtain an IF signal of 1.5 KHz, which IF signal is then mixed (up-converted) with the RF signal to obtain the radio frequency signal which is ultimately utilized to modulate the light beam for transmission over the distance to be measured. By using the up-converting process, the original RF signal from the primary oscillator may be used as the reference frequency to down-convert the transmission frequency signal on the returning light beam and thus derive the IF signal, stable to $1:10^4$, from which is obtained the distance-indicating phase shift data.

As additionally described in the related application, a preferred method of mixing the primary reference RF signal with the divided-down IF signal to directly obtain a single side band modulating signal includes the use of two double-balanced mixers which utilize, as respective RF input, two signals at the reference RF frequency which have been separated in phase by 90°; for example, in a common circuit comprising high- and low-pass RC circuits which have parameter values chosen to produce respective $+\pi/4$ and $-\pi/4$ phase shifts. This mixing method also utilizes, as the respective IF input to the double-balanced mixers, two signals at that lower frequency which have a similar phase separation. It is thus an object of the present invention to provide means by which there may be derived from a primary RF signal a pair of IF signals which have a constant frequency ratio with the RF signal and which, additionally, have a fixed phase relationship with one another.

DRAWINGS

FIG. 1 is a logic block diagram of a digital frequency-dividing circuit according to the present invention which is capable of delivering a pair of IF signals having fixed phase and frequency relationships with respect to an input RF signal, and FIG. 2 depicts waveforms at various points in the circuit of FIG. 1.

PREFERRED EMBODIMENT

The present invention may be most readily described by reference to the drawings of which FIG. 1 shows a logic circuit for digitally deriving the previously discussed IF signals separated by 90 degrees and having a fixed frequency relationship with respect to a higher frequency reference RF signal.

The reference RF signal is actually 14.985 MHz in the preferred embodiment. However, to simplify the explanation of FIG. 1, this value has been rounded to 15 MHz.

Frequency dividers 200, 202 and 204 in FIG. 1 may be decade counters such as those manufactured by Texas Instruments and identified with U.S. Pat. No. 7490. The sole function of these three dividers is to obtain a $1:10^3$ reduction in frequency from the input reference RF. The resulting 15 KHz signal is a square waveform. A circuit for obtaining two squarewaves at 1.5 KHz and separated by 90° from a symmetrical 3KHz (twice the output frequency) is shown to the right of box 206 in FIG. 1. However, to effectively utilize this circuit, a symmetrical 3KHz square wave signal must first be produced from the available 15 KHz signal and this is the function of the apparatus shown in box 206. Effectively what is required is a frequency division by an odd number (5) whereas the usual digital frequency division is by powers of two.

The 15KHz input to 206 is first divided by four (element 208 which may be part of a decade counter) and by two (element 210 which may also be part of a decade counter). The non-symmetrical outputs of 208 and 210 are then directly combined in "NAND" 212. These same outputs are also combined in "NAND" 214 after the lower frequency output has been inverted at 216. Clock signals are supplied to flip-flop 218 through inverter 220 from the 15KHz input to 206. Terminal J of flip-flop 218 is grounded while the enable or K terminal is connected through inverter 222 to the out-put of NAND 212 and the preset or P terminal of 218 is connected directly to the output of NAND 214. The result is a "true" output from flip-flop 218 whenever there is a positive or "true" signal at terminal K and a negative going clock signal at C. There is also a "true" output from 218 whenever terminal P is "false" or negative. A study of the timing diagrams for the signals present at the previously described elements will reveal that the output from flip-flop 218 is a symmetrical 3KHz square wave.

One of the 1.5 KHz IF outputs is obtained by merely dividing the 3KHz signal by two with frequency divider 224 which may be a flip-flop. At the same time, the 3KHz signal is passed through NAND gates 226 and 228 in tandem to obtain a short delay thus insuring that a corresponding signal has already appeared at the output of flip-flop 224 before any attempted processing occurs in flip-flop 230. An inverter 232 inverts the slightly delayed 3KHz signals before presenting them as clock pulses to flip-flop 230.

Referring now to the timing diagram in FIG. 2, it will be shown that the output from flip-flop 230 is delayed by 90° from the output at 224. The 3KHz input to divider 224 is shown at A. Assuming that 224 is a J-K flip-flop connected to trigger on negative transistions, the output from 224 is shown at B as a 1.5 KHz signal. Flip-flop 230 has its J and K terminals connected to the output from 224 (inverter 234 inverting the input for the J terminal) so as to insure that it flips in opposition to flip-flop 224. Further, the 3KHz clock for flip-flop 224 is inverted as shown at C in FIG. 2 (the slight delay is negligible on the scale of FIG. 2) and thus the output from 230 is as shown at D, delayed 90° from the waveform at B. These two 1.5KHz IF signals separated by 90° are subsequently filtered into sine waves and used in the balanced mixers as previously described.

What is claimed is:

1. Digital frequency dividing apparatus for deriving two output signal having fixed phase relationships with each other and a constant frequency ratio with respect to an input signal, said apparatus comprising:
   a. an input terminal for connection with said input signal;
   b. a plurality of digital counters operatively connected in series to each other and to said input terminal for producing a first intermediate signal reduced in frequency by a fixed amount from said input signal;
   c. compensating means operatively connected to the last of said digital counters for further reducing the frequency of said first intermediate signal from said plurality of counters and for producing a symmetrical square wave second intermediate signal;
   d. first bi-stable flip-flop means operatively connected to said compensating means for triggering on transitions of said second intermediate signal from a first condition to a second condition and for providing a first output signal having one-half the frequency of said second intermediate signal;
   e. delay means operatively connected to said compensating means for producing a slightly time-delayed second intermediate signal; and
   f. second bi-stable flip-flop means operatively connected to said first flip-flop means and to said delay means for triggering on transitions of said delayed second intermediate signal corresponding to transitions of said second intermediate signal from said second condition to said first condition and for producing a second output signal also having one-half the frequency of said second intermediate signal and lagging in phase with respect to said first output signal.

* * * * *

PO-1050
(5/69)

UNITED STATES PATENT OFFICE
CERTIFICATE OF CORRECTION

Patent No. __3,753,126__     Dated __14 August 1973__

Inventor(s) Robin H. Hines, William L. Hollinshead, Thomas O. Bolden

It is certified that error appears in the above-identified patent and that said Letters Patent are hereby corrected as shown below:

Column 3, Line 5, "U.S. Pat. No." should read --Serial No.--.

Column 4, Line 17, "signal" should read --signals--.

Signed and sealed this 20th day of November 1973.

(SEAL)
Attest:

EDWARD M. FLETCHER, JR.
Attesting Officer

RENE D. TEGTMEYER
Acting Commissioner of Patents